United States Patent [19]

Krautkramer et al.

[15] 3,665,754
[45] May 30, 1972

[54] APPARATUS TO PREVENT MISMEASURING OF WALL THICKNESS GAUGING BY ULTRASOUND

[72] Inventors: Herbert Krautkramer; Joseph Krautkramer, both of Luxemburger Str. 449, Cologne, Germany

[22] Filed: Oct. 11, 1968

[21] Appl. No.: 766,795

[30] Foreign Application Priority Data

Nov. 29, 1967 Germany.....................P 16 23 214.7

[52] U.S. Cl. ...........................................................73/67.8 R
[51] Int. Cl. .........................................................G01n 29/00
[58] Field of Search..........................................73/67.8, 67.9

[56] References Cited

UNITED STATES PATENTS 3,260,105  6/1966  McNulty.................................73/67.9
3,372,576  3/1968  Dory.......................................73/67.9
3,427,866  2/1969  Weighart.............................73/67.9 X
3,482,435  12/1969  Gunkel..................................73/67.9
3,509,752  5/1970  Moore....................................73/67.9

Primary Examiner—Richard C. Queisser
Assistant Examiner—Arthur E. Korkesz
Attorney—Harry E. Aine

[57] ABSTRACT

Method and apparatus are disclosed for preventing mismeasurement when gauging wall thickness by an ultrasonic pulse echo transit time method using separate transmitter and receiver probes. The pulse transit time, in the specimen plus a fixed known period of time is taken as the gauging value. Cross talk, i.e., an echo from the probe-to-specimen interface, is prevented from causing mismeasurements of thin wall specimens by providing an electronic gate which is opened during the cross talk time interval for receiving cross talk pulses having an amplitude over a predetermined lower threshold value to actuate a mismeasurement warning light or to prevent the gauge from indicating wall thickness.

5 Claims, 3 Drawing Figures ic member and the contact surface which is in touch with the work piece. Consequently, the following time sequence of pulses and transit times will appear at the receiver: an initial pulse generated by the oscillator of the transmitter probe, a transit time for transit through the interspace of the transmitter probe, partial reflection of the transmitted pulse from the probe-to-specimen interface which may transit the interspace of the receiver probe to produce a cross talk echo. The time between the transmitted pulse and receipt of the partial reflection corresponds to the transit time of the pulse in the interspace of the transmitter and receiver probe. In case the probe is coupled to the work piece or specimen, the nonreflected portion of the transmitted sound pulse enters the specimen and is reflected from the opposite surface of the specimen as a bottom echo. The time between receipt of the partial reflection and the receipt of the bottom reflection corresponds to the pulse transit time in the specimen and consequently is equivalent to the wall thickness.

APPARATUS TO PREVENT MISMEASURING OF WALL THICKNESS GAUGING BY ULTRASOUND

DESCRIPTION OF THE PRIOR ART

Heretofore gauging wall thickness by ultrasound pulses has been performed with separate transmitter and receiver probes, in order to render feasible the gauging of thin wall thicknesses. The regime of thin wall thicknesses is involved if the transit time from the sound entry point through one face of the work piece and back through the reflecting point from the opposite face is comparable to the pulse length. It is known to construct the transmitter and receiver probes (transducers) in such a manner, that an interspace, composed of water, plastics or other suitable material, is arranged between the piezoelectric member and the contact surface which is in touch with the work piece. Consequently, the following time sequence of pulses and transit times will appear at the receiver: an initial pulse generated by the oscillator of the transmitter probe, a transit time for transit through the interspace of the transmitter probe, partial reflection of the transmitted pulse from the probe-to-specimen interface which may transit the interspace of the receiver probe to produce a cross talk echo. The time between the transmitted pulse and receipt of the partial reflection corresponds to the transit time of the pulse in the interspace of the transmitter and receiver probe. In case the probe is coupled to the work piece or specimen, the nonreflected portion of the transmitted sound pulse enters the specimen and is reflected from the opposite surface of the specimen as a bottom echo. The time between receipt of the partial reflection and the receipt of the bottom reflection corresponds to the pulse transit time in the specimen and consequently is equivalent to the wall thickness.

Because of the geometric sound path, the wall thickness gauging range cannot be fully exploited when the wall thickness approaches zero thickness. Therefore, there results a lower gaugeable wall thickness limit of about 1.5 mm (0.06 inch).

Furthermore it is known to measure the transit time in the work piece either from a fixed starting time or from a time dependent on the length of the interspace. The measurement is performed for example by starting to charge a capacitor at the instant of the starting time and by terminating charging of the capacitor by the bottom echo pulse. Therefore, the quantity of charge stored in the capacitor is a measure of the transit time elapsed, and consequently of the wall thickness. If the capacitor is discharged via a pointer instrument, the latter will display certain deflections at continuous pulse repetition, which can be directly defined in wall thickness, provided the velocity of sound in the material is known.

It is a well known disadvantage of such an apparatus that upon gauging of thin wall thicknesses, the transmitter and receiver probes have to be positioned closely together, causing a considerable increase of the cross talk echo in relation to the bottom echo. Moreover, the height of the cross talk echo pulse, in relation to the bottom echo pulse, depends on the conditions of coupling. When coupling is good, i.e., the probe is well set on a plane work piece with a coupling agent, a maximum of sound energy enters from the interspace into the specimen, and the cross talk echo becomes a minimum. If the contact area becomes smaller, caused for example by bends and corrosion of the specimen, or the coupling agent becomes less effective, caused for example by hot surfaces, the amount of sound energy transferred to the specimen decreases, causing an increase in the amplitude of the cross talk echo pulse. In case the cross talk echo pulse amplitude exceeds some minimum threshold value it will simulate a bottom echo and stop charging of the capacitor, resulting in an erroneous measurement of wall thickness.

SUMMARY OF THE PRESENT INVENTION

The principal object of the present invention is to provide an improved method and apparatus for ultrasonic wall thickness gauging which avoids erroneous measurements caused by large amplitude cross talk pulse echoes which can result, for example, from bent or hot coupling surfaces.

One feature of the present invention is the use of pulses occurring in the transit time interval of the cross talk echo as electric signals for blocking or indicating an erroneous transit time measurement when the amplitude of the cross talk echo is comparable in amplitude to the bottom echo utilized for terminating the transit time measurement.

Another feature of the present invention is the same as the preceding feature wherein an electric gate is employed for sampling transit time pulses occurring entirely within or partially within the time interval of the cross talk echo. The threshold of the gate is set for passing only those pulses which have a height which is at least equal to the amplitude of the bottom echo signals.

Other features and advantages of the present invention become apparent upon a perusal of the following specification taken in connection with the accompanying drawings wherein:

DESCRIPTION OF THE PREFERRED EMBODIMENTS

Figure 1:
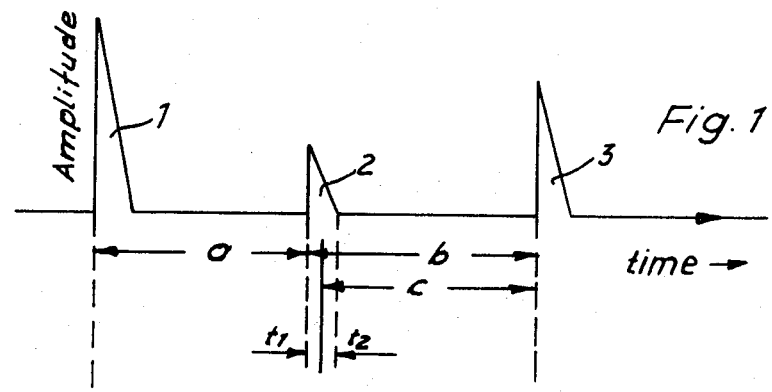
FIG. 1 is a plot of signal amplitude versus transit time depicting the cross talk and bottom echo signals.
Figure 2:
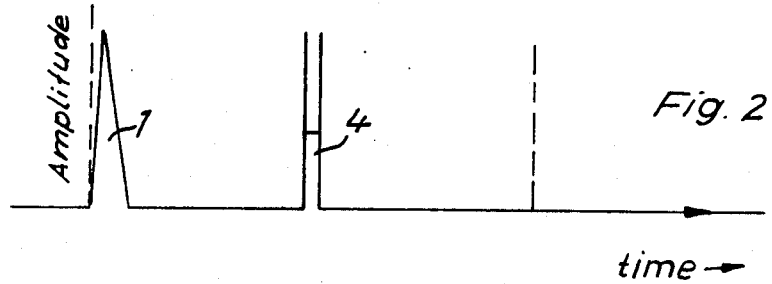
FIG. 2 is a transit time diagram similar to FIG. 1, as displayed on the screen of a cathode ray tube, with the presentation of the initial pulse and an electric gate in the range of the cross talk echo.

Referring now to FIGS. 1 and 2 the possibly erroneous measurements of wall thickness are to be prevented by use of a conventional electric gate circuit set in such a manner that its gate covers the start of the cross talk echo 2 and does not project into the measuring range c. The open time of the electric gate is shown at 4 in the time diagram of FIG. 2. The gate can be opened either on the start of the cross talk echo 2, being triggered by the latter, or at any chosen time prior to the cross talk echo 2, e.g. by the echo of an auxiliary transducer appearing before the cross talk echo, provided it starts later than the initial pulse 1. The threshold of the gate is adjusted lower than or equal to the height of the threshold of the capacitor charging stop unit. If a pulse appears in the output of the gate an additional signal will be generated, signaling that a pulse is located in the gate, and in accordance with the further arrangement the transit time indication can be switched off.

In an alternative embodiment of the present invention, a pointer instrument is employed for measuring the charge on the capacitor and in this embodiment the cutoff signal can be used for holding the pointer in an off scale position, e.g., towards the left end of the indicator scale.

Figure 3:
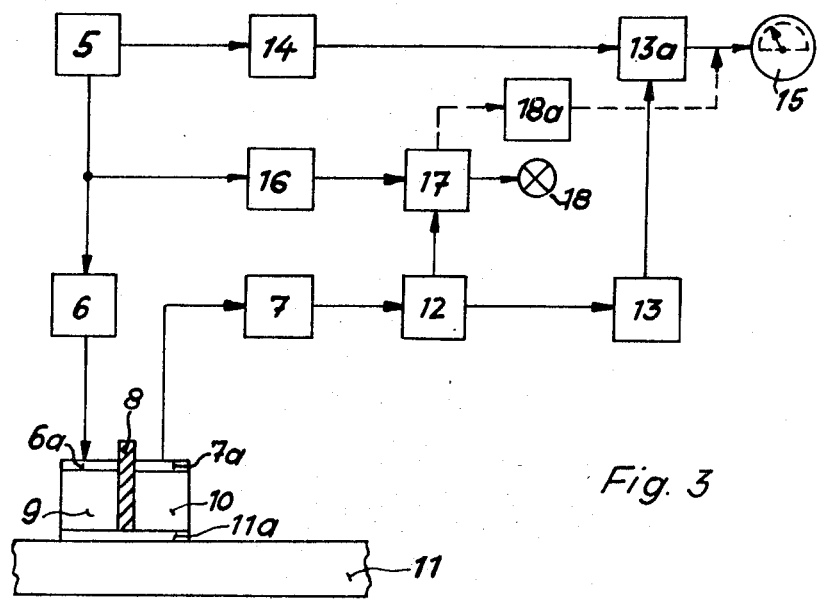
FIG. 3 is a block diagram of a wall thickness gauging instrument employing the electric gate circuit.

Referring now to FIG. 3, the pulse echo thickness measuring circuit is shown in schematic block diagram form. A pulse transmitter 6 is controlled by a repetition frequency generator 5 having a frequency of for example 1,000 Hz. The electric pulses produce ultrasonic pulses in a transmitter probe 6a. The ultrasonic pulses traverse an interspace 9 of the transmitter probe and enter the specimen 11 via the coupling face 11a. The two probes are acoustically and electrically separated by an insulating layer 8. The pulses are reflected from the opposite surface of the specimen 11 and arrive through another interspace 10 at receiver probe 7a where they are converted into electric pulses which are amplified in an amplifier 7. All amplified pulses exceeding a certain height are passed by level threshold circuit 12 to a charge stop stage 13 which stops the charge current fed to a capacitor 13a.

Synchronously with the pulses to the transmitter 6, the repetition frequency generator 5 sends pulses to a control stage 14 to start the charging current to the capacitor 13a. The amount of electric charge stored in the capacitor 13a is a measure of the transit time of the ultrasonic pulses in the specimen 11. The charge on the capacitor 13a is indicated on a pointer instrument 15.

According to the invention an electric gate circuit 16 is triggered by a signal derived from the repetition frequency generator 5 with a delay such that the time interval in which the cross talk echo originating from the coupling face 11a occurs, it is entirely or partially covered by the gate interval 4. A coincidence stage 17 transmits all pulses which are relayed to it by the amplifier threshold level sensing stage 12 and which are received within the gate time 4 to provide electric signals to a warning signal lamp 18 which signals a pulse over a certain height standing in the electric gate. The invention provides that these electric signals can also be relayed to a blocking stage 18a which blocks indication of the measuring value on the pointer instrument 15.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In a pulsed ultrasonic measuring apparatus for measuring the wall thickness of specimens, means forming a transmitter probe for transmitting ultrasonic pulses into a specimen to be measured, means forming a receiver probe for receiving echo pulses from the specimen, means for measuring the transit time of the received echo pulses in the specimen for measuring wall thickness of the specimen, the improvement comprising, means for sensing the pulse height of echo pulses received within a certain cross talk transit time interval corresponding to echo pulses reflected from the input face of the specimen to derive an output if the cross talk echo pulse exceeds a certain predetermined pulse height, and means responsive to the output of said pulse height level sensor for preventing erroneous measurements of wall thickness if the cross talk echo pulse exceeds the certain predetermined pulse height.

2. The apparatus of claim 1 including, a gate circuit for gating echo pulses falling within the certain cross talk transit time interval to said erroneous measurement prevention means.

3. The apparatus of claim 2 wherein said erroneous measurement prevention means includes, a warning light actuated by the gated output of said pulse height level sensor.

4. The apparatus of claim 2 wherein said means for preventing erroneous measurement includes means for blocking operation of said pulse transit time measuring means.

5. The apparatus of claim 4 wherein said pulse transit time measuring means includes a pointer instrument for indicating the wall thickness, and means for applying the output signals from said gate circuit to said pointer instrument means for causing the pointer of said pointer instrument means to point to an off measurement scale portion thereof.

* * * * *